(12) United States Patent
Sang et al.

(10) Patent No.: US 11,093,778 B2
(45) Date of Patent: Aug. 17, 2021

(54) METHOD AND SYSTEM FOR SELECTING IMAGE REGION THAT FACILITATES BLUR KERNEL ESTIMATION

(71) Applicant: HUAZHONG UNIVERSITY OF SCIENCE AND TECHNOLOGY, Hubei (CN)

(72) Inventors: Nong Sang, Hubei (CN); Lerenhan Li, Hubei (CN); Hao Yan, Hubei (CN); Changxin Gao, Hubei (CN); Luxin Yan, Hubei (CN); Shiwei Zhang, Hubei (CN); Zhixiong Pi, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 545 days.

(21) Appl. No.: 16/079,565

(22) PCT Filed: Jan. 8, 2018

(86) PCT No.: PCT/CN2018/071692
§ 371 (c)(1),
(2) Date: Aug. 24, 2018

(87) PCT Pub. No.: WO2019/010932
PCT Pub. Date: Jan. 17, 2019

(65) Prior Publication Data
US 2021/0192251 A1   Jun. 24, 2021

(30) Foreign Application Priority Data

Jul. 14, 2017   (CN) .......................... 201710572664.9

(51) Int. Cl.
*G06K 9/00* (2006.01)
*G06K 9/20* (2006.01)
*G06K 9/46* (2006.01)

(52) U.S. Cl.
CPC ......... *G06K 9/2054* (2013.01); *G06K 9/4604* (2013.01); *G06K 9/4642* (2013.01)

(58) Field of Classification Search
None
See application file for complete search history.

(56) References Cited

U.S. PATENT DOCUMENTS 9,659,351 B2 * 5/2017 Aliaga .................... G06T 5/001

FOREIGN PATENT DOCUMENTS

| CN | 102254309 | 11/2011 |
| CN | 102436639 | 5/2012 |

(Continued)

OTHER PUBLICATIONS

Zhang et al., "Image deblurring using robust sparsity priors", 2015 (Year: 2015).*

(Continued)

*Primary Examiner* — Soo Jin Park
(74) *Attorney, Agent, or Firm* — JCIPRNET

(57) ABSTRACT

The present invention discloses a method and system for selecting an image region that facilitates blur kernel estimation, in which the method includes: calculating a relative total variation value of each pixel in a blurred image to obtain a relative total variation mapping image; setting a threshold value to determine whether respective pixel in the image is a boundary pixel or not; then sampling the blurred image and its relative total variation mapping image to obtain a series of image patches; and finally counting the number of boundary pixels in each mapping image patch and selecting out an image region that facilitates blur kernel estimation. According to the method and the system, the problems of excessive dependency on operator experience, low efficiency and the like in the existing region selection methods are effectively solved. The image region that facili- (Continued)

tates blur kernel estimation is automatically selected out. And the method and the system are suitable for the application occasion of the blur kernel estimation in an image deblurring algorithm.

8 Claims, 2 Drawing Sheets

(56) References Cited

FOREIGN PATENT DOCUMENTS

| CN | 102663718 | 9/2012 |
| CN | 104168336 | 11/2014 |
| CN | 105096316 | 11/2015 |
| CN | 107403414 | 11/2017 |

OTHER PUBLICATIONS

Xu et al., "structure extraction from texture via relative total variation", 2012 (Year: 2012).*
Pan et al., "Kernel estimation from salient structure for robust motion deblurring", 2013 (Year: 2013).*
"International Search Report (Form PCT/ISA/210)", dated Apr. 16, 2018, pp. 1-5.

* cited by examiner

METHOD AND SYSTEM FOR SELECTING IMAGE REGION THAT FACILITATES BLUR KERNEL ESTIMATION

CROSS-REFERENCE TO RELATED APPLICATION

This application is a 371 application of an international PCT application serial no. PCT/CN2018/071692, filed on Jan. 8, 2018, which claims priority to and the benefit of China Patent Application No. 201710572664.9, filed on Jul. 14, 2017. The entirety of each of the above-mentioned patent applications is hereby incorporated by reference herein and made a part of this specification.

BACKGROUND

Field of the Present Invention

The present invention belongs to the field of image processing and pattern recognition, and more specifically relates to a method and system for selecting an image region that facilitates blur kernel estimation.

Description of the Related Art

Image blurring is a common phenomenon of image degradation, and its causes are many, such as relative motion between the camera and the shooting scene during exposure (motion blur), turbulence in the air due to high temperature and the like (turbulence blur), difference between the camera-to-scene distance and the sharp imaging focal length (out-of-focus blur) and the like. Blurred images not only visually produce a poor viewing experience, but also affect the accuracy of some computer vision tasks (such as image classification and target tracking) that require the use of images. Therefore, the technique of correcting blurred images (also called image deblurring) has become a key issue in the field of image processing and pattern recognition.

The process of image blurring is usually modeled as a two-dimensional linear convolution of a sharp image with a blur kernel (also called a point spread function). The purpose of the image deblurring is to estimate the potential sharp image based on the obtained blurred image. Current image deblurring techniques are generally based on a least-squares estimate that maximizes a posterior probability (MAP), and use the "two-stage method" to estimate the sharp image. The "two-stage method" first adopts blind deconvolution to estimate the blur kernel with the relevant information in the image, and then adopts non-blind deconvolution to estimate the sharp image with the estimated blur kernel. Large-scale and strong-boundary regions in the image contain relatively rich blur kernel information that facilitates blur kernel estimation, while smooth and textured regions in the image do not contribute to blur kernel estimation and even affect the accuracy of blur kernel estimation. Therefore, it is of great importance to select an image region that facilitates blur kernel estimation. Methods for selecting an image region mainly include three types: (1) full-image input, in which the blur kernel is estimated by taking the full image as an input; (2) empirical selection, in which through the "trial-and-error method", an image patch with more structural regions is usually selected based on the operator's experience, which features no scientific basis and low efficiency; and (3) automatic selection, in which a machine learning method containing both training and inference is adopted, and the training requires a lot of data and takes a long time.

Therefore, there are problems of dependency on operational experience, no scientific basis and low efficiency in the image region selection method in the prior art.

SUMMARY OF THE PRESENT INVENTION

In view of the above-described problems, the present invention provides a method and system for selecting an image region that facilitates blur kernel estimation, thereby solving technical problems of dependency on operational experience, no scientific basis and low efficiency in the image region selection method in the prior art.

In order to achieve the above objective, according to an aspect of the present invention, there is provided a method for selecting an image region that facilitates blur kernel estimation:

(1) calculating a relative total variation value RTV(p) of each pixel p in a blurred image B to obtain a relative total variation mapping image $B_{rtv}$ with the same size as the blurred image;

(2) determining that a pixel p is a boundary pixel if a relative total variation value RTV(p) of the pixel p is less than a threshold value; otherwise, determining that the pixel p is a non-boundary pixel;

(3) sampling the blurred image B and its relative total variation mapping image $B_{rtv}$ to obtain image patches $B^i$ and mapping image patches $B_{rtv}^{\,i}$ so that an image patch set $P_B = \{B^1, B^2, \ldots, B^i\}$ and a mapping image patch set $P_{rtv} = \{B_{rtv}^{\,1}, B_{rtv}^{\,2}, \ldots, B_{rtv}^{\,i}\}$ are respectively obtained after these image patches are cropped; and (4) counting the number of boundary pixels in each mapping image patch $B_{rtv}^{\,i}$, and selecting out a mapping image patch $B_{rtv}^{\,i*}$ with the largest number of boundary pixels in the mapping image patch set $P_{rtv} = \{B_{rtv}^{\,1}, B_{rtv}^{\,2}, \ldots, B_{rtv}^{\,i}\}$, an image patch $B^{i*}$ corresponding to the mapping image patch $B_{rtv}^{\,i*}$ being an image region that facilitates blur kernel estimation.

Further, the relative total variation value RTV(p) is:

$$RTV(p) = |RTV_x(p)| + |RTV_y(p)| \text{ or } RTV(p) = \sqrt{|RTV_x(p)|^2 + |RTV_y(p)|^2},$$

wherein $RTV_x(p)$ represents a relative total variation value of the pixel p in the horizontal direction, and $RTV_y(p)$ represents a relative total variation value of the pixel p in the vertical direction.

Further, the relative total variation value of the pixel p in the horizontal direction is:

$$RTV_x(p) = \frac{\sum_{q \in R(p)} g_{p,q} \cdot |(\partial_x B)_q|}{\left|\sum_{q \in R(p)} g_{p,q} \cdot (\partial_x B)_q\right| + \varepsilon},$$

wherein R(p) represents a neighborhood centered on the pixel p, q represents a pixel in the neighborhood, $(\partial_x B)_q$ represents a partial derivative of the pixel q in the horizontal direction, $\varepsilon$ represents an infinitesimal quantity which ensures that the denominator of the above equation is not zero, and $g_{p,q}$ represents a weight function, the value of which is inversely proportional to the distance between the pixel q and the pixel p; and the relative total variation value of the pixel p in the vertical direction is:

$$RTV_y(p) = \frac{\sum\limits_{q \in R(p)} g_{p,q} \cdot |(\partial_y B)_q|}{\left|\sum\limits_{q \in R(p)} g_{p,q} \cdot (\partial_y B)_q\right| + \varepsilon},$$

wherein $(\partial_y B)_q$ represents a partial derivative of the pixel q in the vertical direction.

Further, the step (3) is specifically implemented as follows:

performing pixel overlapping sampling on the blurred image B and its relative total variation mapping image $B_{rtv}$, and in a window sliding manner, cropping an image patch $B^i$ and a mapping image patch $B_{rtv}^i$ with a size of m×m every s pixels, thereby obtaining an image patch set $P_B=\{B^1, B^2, \ldots, B^i\}$ and a mapping image patch set $P_{rtv}=\{B_{rtv}^1, B_{rtv}^2, \ldots, B_{rtv}^i\}$ after cropping the image patches from left to right and from top to bottom.

According to an aspect of the present invention, there is provided a system for selecting an image region that facilitates blur kernel estimation, comprising:

a relative total variation module configured to calculate a relative total variation value RTV(p) of each pixel p in a blurred image B so as to obtain a relative total variation mapping image $B_{rtv}$ with the same size as the blurred image;

a determination module configured to determine that a pixel p is a boundary pixel if its relative total variation value RTV(p) is less than a threshold value, and otherwise determine that the pixel p is a non-boundary pixel;

a sampling module configured to sample the blurred image B and its relative total variation mapping image $B_{rtv}$ to obtain image patches $B^i$ and mapping image patches $B_{rtv}^i$ so that an image patch set $P_B=\{B^1, B^2, \ldots, B^i\}$ and a mapping image patch set $P_{rtv}=\{B_{rtv}^1, B_{rtv}^2, \ldots, B_{rtv}^i\}$ are respectively obtained after these image patches are cropped; and a region selection module configured to count the number of boundary pixels in each mapping image patch $B_{rtv}^i$, and selecting out a mapping image patch $B_{rtv}^{i*}$ with the largest number of boundary pixels in the mapping image patch set $P_{rtv}=\{B_{rtv}^1, B_{rtv}^2, \ldots, B_{rtv}^i\}$, an image patch $B^{i*}$ corresponding to the mapping image patch $B_{rtv}^{i*}$ being an image region that facilitates blur kernel estimation.

Further, the relative total variation value RTV(p) is:

$$RTV(p) = |RTV_x(p)| + |RTV_y(p)| \text{ or}$$

$$RTV(p) = \sqrt{|RTV_x(p)|^2 + |RTV_y(p)|^2},$$

wherein $RTV_x(p)$ represents a relative total variation value of the pixel p in the horizontal direction, and $RTV_y(p)$ represents a relative total variation value of the pixel p in the vertical direction.

Further, the relative total variation value of the pixel p in the horizontal direction is:

$$RTV_x(p) = \frac{\sum\limits_{q \in R(p)} g_{p,q} \cdot |(\partial_x B)_q|}{\left|\sum\limits_{q \in R(p)} g_{p,q} \cdot (\partial_x B)_q\right| + \varepsilon},$$

wherein R(p) represents a neighborhood centered on the pixel p, q represents a pixel in the neighborhood, $(\partial_x B)_q$ represents a partial derivative of the pixel q in the horizontal direction, $\varepsilon$ represents an infinitesimal quantity which ensures that the denominator of the above equation is not zero, and $g_{p,q}$ represents a weight function, the value of which is inversely proportional to the distance between the pixel q and the pixel p; and the relative total variation value of the pixel p in the vertical direction is:

$$RTV_y(p) = \frac{\sum\limits_{q \in R(p)} g_{p,q} \cdot |(\partial_y B)_q|}{\left|\sum\limits_{q \in R(p)} g_{p,q} \cdot (\partial_y B)_q\right| + \varepsilon},$$

wherein $(\partial_y B)_q$ represents a partial derivative of the pixel q in the vertical direction.

Further, the sampling module is specifically implemented as follows:

performing pixel overlapping sampling on the blurred image B and its relative total variation mapping image $B_{rtv}$, and in a window sliding manner, cropping an image patch $B^i$ and a mapping image patch $B_{rtv}^i$ with a size of m×m every s pixels, thereby obtaining an image patch set $P_B=\{B^1, B^2, \ldots, B^i\}$ and a mapping image patch set $P_{rtv}=\{B_{rtv}^1, B_{rtv}^2, \ldots, B_{rtv}^i\}$ after cropping the image patches from left to right and from top to bottom.

In general, compared with the prior art, the present invention has the following beneficial effects:

(1) in the present invention, an image region that facilitates blur kernel estimation is selected by a relative total variance measurement method, which is capable of improving the accuracy of the estimation result;

(2) in the present invention, an image region that facilitates blur kernel estimation can be automatically selected, thereby overcoming the defects of dependency on operational experience and low efficiency in the existing method; and (3) in the present invention, the relative total variance measurement method is adopted to determine whether the pixel is a boundary pixel or not, and the number of boundary pixels in the image region is counted to determine whether the image region is an image region that facilitates blur kernel estimation, which is simple and clear. Thus, the present invention is particularly suitable for input image selection of blur kernel estimation in image deblurring algorithms.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention.

Figure 1:
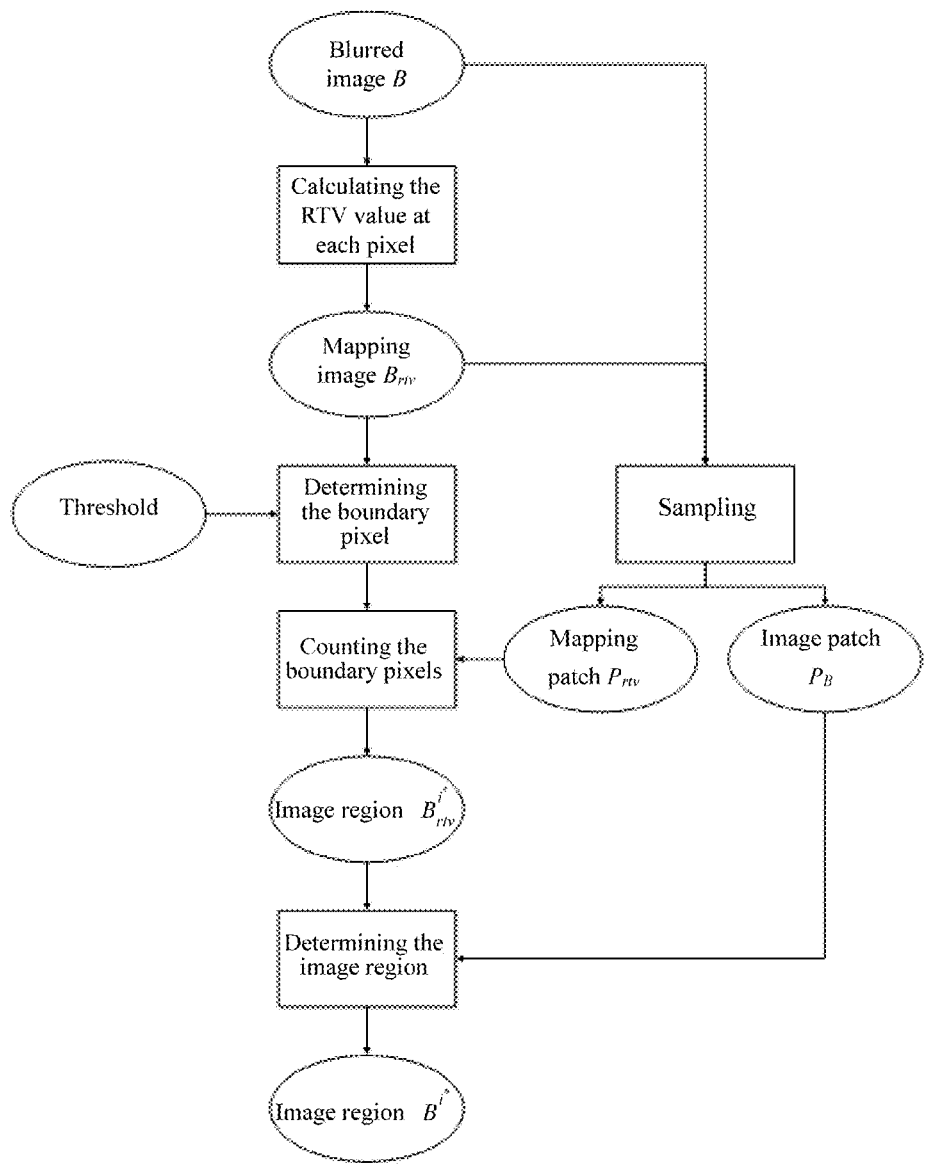
FIG. 1 is a flowchart of a method for selecting an image region that facilitates blur kernel estimation according to the present invention.

As shown in FIG. 1, a general flowchart of a method for selecting an image region that facilitates blur kernel estimation according to the present invention is illustrated, and the method according to the present invention specifically comprises:

(1) calculating a relative total variation value RTV(p) of each pixel p in a blurred image B to obtain a relative total variation mapping image $B_{rtv}$ with the same size as the blurred image;

(2) setting a threshold value threshold, and determining that a pixel p is a boundary pixel if its relative total variation value RTV(p) is less than a threshold value; otherwise, determining that the pixel p is a non-boundary pixel;

(3) performing pixel overlapping sampling on the blurred image B and its relative total variation mapping image $B_{rtv}$, and in a window sliding manner, cropping an image patch $B^i$ and a mapping image patch $B_{rtv}^i$ with a size of m×m every s pixels, thereby obtaining an image patch set $P_B = \{B^1, B^2, \ldots, B^i\}$ and a mapping image patch set $P_{rtv} = \{B_{rtv}^1, B_{rtv}^2, \ldots, B_{rtv}^i\}$ after cropping the image patches from left to right and from top to bottom; and (4) counting the number of boundary pixels in each mapping image patch $B_{rtv}^i$, and selecting out a mapping image patch $B_{rtv}^{i*}$ with the largest number of boundary pixels in the mapping image patch set $P_{rtv} = \{B_{rtv}^1, B_{rtv}^2, \ldots, B_{rtv}^i\}$, an image patch $B^{i*}$ corresponding to the mapping image patch $B_{rtv}^{i*}$ being an image region that facilitates blur kernel estimation.

Preferably, in the step (2), the threshold value threshold is set to be 0.1, and if the relative total variation value RTV(p) of the pixel p is less than 0.1, the pixel p is determined to be a boundary pixel; otherwise, the pixel p is determined to be a non-boundary pixel.

Preferably, in the step (3), the value of s is set to be 20, and the size of the image patch $B^i$ is 200×200.

Preferably, the relative total variation value RTV(p) is:

$$RTV(p) = |RTV_x(p)| + |RTV_y(p)| \text{ or}$$
$$RTV(p) = \sqrt{|RTV_k(p)|^2 + |RTV_y(p)|^2},$$

wherein $RTV_x(p)$ represents a relative total variation value of the pixel p in the horizontal direction, and $RTV_y(p)$ represents a relative total variation value of the pixel p in the vertical direction.

Further, the relative total variation value of the pixel p in the horizontal direction is:

$$RTV_x(p) = \frac{\sum_{q \in R(p)} g_{p,q} \cdot |(\partial_x B)_q|}{\left|\sum_{q \in R(p)} g_{p,q} \cdot (\partial_x B)_q\right| + \varepsilon},$$

wherein R(p) represents a neighborhood centered on the pixel p, q represents a pixel in the neighborhood, $(\partial_x B)_q$ represents a partial derivative of the pixel q in the horizontal direction, $\varepsilon$ represents an infinitesimal quantity, which ensures that the denominator of the above equation is not zero, and $g_{p,q}$ represents a weight function, the value of which is inversely proportional to the distance between the pixel q and the pixel p; and the relative total variation value of the pixel p in the vertical direction is:

$$RTV_y(p) = \frac{\sum_{q \in R(p)} g_{p,q} \cdot |(\partial_y B)_q|}{\left|\sum_{q \in R(p)} g_{p,q} \cdot (\partial_y B)_q\right| + \varepsilon},$$

wherein $(\partial_y B)_q$ represents a partial derivative of the pixel q in the vertical direction.

Further, the weight function $g_{p,q}$ is expressed as below:

$$g_{p,q} \propto \exp\left(-\frac{(x_p - x_q)^2 + (y_p - y_q)^2}{2\sigma^2}\right)$$

wherein $x_p$ represents the horizontal coordinate of the pixel p, $y_p$ represents the vertical coordinate of the pixel p, $x_q$ represents the horizontal coordinate of the pixel q, $y_q$ represents the vertical coordinate of the pixel q, exp($\square$) represents an exponential function and $\sigma$ represents a standard deviation.

Figure 2A:
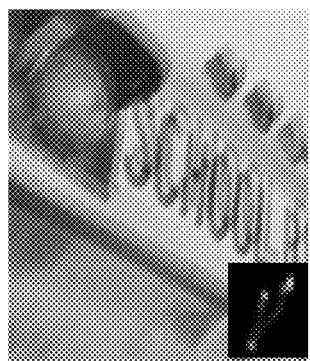
FIG. 2A shows a blurred image and its real blur kernel.
Figure 2B:
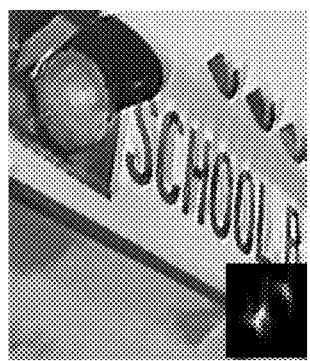
FIG. 2B shows an image restored by full-image blur kernel estimation.
Figure 2C:
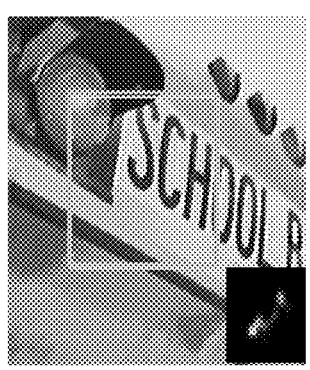
FIG. 2C shows an image restored by blur kernel estimation with one selected image region according to the present invention.

FIGS. 2A, 2B and 2C are schematic diagrams showing the selection result of an image region facilitates blur kernel estimation, in which FIG. 2A shows a blurred image and its real blur kernel, FIG. 2B shows an image restored by full-image blur kernel estimation, and FIG. 2C shows an image restored by blur kernel estimation with one selected image region according to the present invention. As can be seen from FIGS. 2A, 2B and 2C, through adopting the method for selecting an image region that facilitates blur kernel estimation according to the present invention to select an image region for performing blur kernel estimation, a more accurate blur kernel estimation result than using the full-image estimation can be obtained, and thus, the image restoration result with the estimated blur kernel is ideal. It can be seen from comparison of the restoration structures in FIGS. 2A, 2B and 2C that in the method according to the present invention, an image patch with more boundary regions can be automatically selected to perform blur kernel estimation, and thus an accurate estimation result and an ideal image restoration effect can be obtained, which significantly improving the restoration efficiency of the respective algorithm. Therefore, the method according to the present invention is especially suitable for the field of image deblurring.

In the present invention, the relative total variance measurement method is adopted to select a large-scale and strong-boundary structural region in the image as an input in the blur kernel estimation process in the image deblurring algorithm, which improves the accuracy and operational efficiency of the blur kernel estimation and effectively solves the problems of dependency on operational experience, no scientific basis, low efficiency and the like in the existing method.

While particular embodiments of the present invention have been shown and described, it will be obvious to those skilled in the art that changes and modifications may be made without departing from the spirit and scope of the present invention.

What is claimed is:

1. A method for selecting an image region that facilitates blur kernel estimation, comprising:
   (1) calculating a relative total variation value RTV(p) of each pixel p in a blurred image B to obtain a relative total variation mapping image $B_{rtv}$ with a same size as the blurred image;
   (2) determining that the pixel p is a boundary pixel if its relative total variation value RTV(p) is less than a threshold value; otherwise, determining that the pixel p is a non-boundary pixel;
   (3) sampling the blurred image B and its relative total variation mapping image $B_{rtv}$ to obtain image patches $B^i$ and mapping image patches $B_{rtv}^i$ so that an image patch set $P_B = \{B^1, B^2, \ldots, B^i\}$ and a mapping image patch set $P_{rtv} = \{B_{rtv}^1, B_{rtv}^2, \ldots, B_{rtv}^i\}$ are respectively obtained after these image patches are cropped; and
   (4) counting a number of boundary pixels in each mapping image patch $B_{rtv}^i$, and selecting out a mapping image patch $B_{rtv}^{i*}$ with a largest number of boundary pixels in the mapping image patch set $P_{rtv} = \{B_{rtv}^1, B_{rtv}^2, \ldots, B_{rtv}^i\}$, an image patch $B^{i*}$ corresponding to the mapping image patch $B_{rtv}^{i*}$ being an image region that facilitates blur kernel estimation,
wherein the relative total variation value RTV(p) is:

$$RTV(p) = |RTV_x(p)| + |RTV_y(p)| \text{ or}$$

$$RTV(p) = \sqrt{|RTV_x(p)|^2 + |RTV_y(p)|^2},$$

wherein $RTV_x(p)$ represents a relative total variation value of the pixel p in a horizontal direction, and $RTV_y(p)$ represents a relative total variation value of the pixel p in a vertical direction.

2. The method for selecting an image region that facilitates blur kernel estimation according to claim 1, wherein the relative total variation value of the pixel p in the horizontal direction is:

$$RTV_x(p) = \frac{\sum_{q \in R(p)} g_{p,q} \cdot |(\partial_x B)_q|}{\left|\sum_{q \in R(p)} g_{p,q} \cdot (\partial_x B)_q\right| + \varepsilon},$$

wherein R(p) represents a neighborhood centered on the pixel p, q represents a pixel in the neighborhood, $(\partial_x B)_q$ represents a partial derivative of the pixel q in the horizontal direction, $\varepsilon$ represents an infinitesimal quantity which ensures that the denominator of the above equation is not zero, and $g_{p,q}$ represents a weight function, the value of which is inversely proportional to a distance between the pixel q and the pixel p; and the relative total variation value of the pixel p in the vertical direction is:

$$RTV_y(p) = \frac{\sum_{q \in R(p)} g_{p,q} \cdot |(\partial_y B)_q|}{\left|\sum_{q \in R(p)} g_{p,q} \cdot (\partial_y B)_q\right| + \varepsilon},$$

wherein $(\partial_y B)_q$ represents a partial derivative of the pixel q in the vertical direction.

3. The method for selecting an image region that facilitates blur kernel estimation according to claim 2, wherein the step (3) is specifically implemented as follows:
   performing pixel overlapping sampling on the blurred image B and its relative total variation mapping image $B_{rtv}$, and in a window sliding manner, cropping an image patch $B^i$ and a mapping image patch $B_{rtv}^i$ with a size of m×m every s pixels, thereby obtaining the image patch set $P_B = \{B^1, B^2, \ldots, B^i\}$ and the mapping image patch set $P_{rtv} = \{B_{rtv}^1, B_{rtv}^2, \ldots, B_{rtv}^i\}$ after cropping the image patches from left to right and from top to bottom.

4. The method for selecting an image region that facilitates blur kernel estimation according to claim 1, wherein the step (3) is specifically implemented as follows:
   performing pixel overlapping sampling on the blurred image B and its relative total variation mapping image $B_{rtv}$, and in a window sliding manner, cropping an image patch $B^i$ and a mapping image patch $B_{rtv}^i$ with a size of m×m every s pixels, thereby obtaining the image patch set $P_B = \{B^1, B^2, \ldots, B^i\}$ and the mapping image patch set $P_{rtv} = \{B_{rtv}^1, B_{rtv}^2, \ldots, B_{rtv}^i\}$ after cropping the image patches from left to right and from top to bottom.

5. A system for selecting an image region that facilitates blur kernel estimation, comprising:
   a relative total variation module configured to calculate a relative total variation value RTV(p) of each pixel p in a blurred image B so as to obtain a relative total variation mapping image $B_{rtv}$ with a same size as the blurred image;
   a determination module configured to determine that the pixel p is a boundary pixel if its relative total variation value RTV(p) is less than a threshold value, and otherwise determine that the pixel p is a non-boundary pixel;
   a sampling module configured to sample the blurred image B and its relative total variation mapping image $B_{rtv}$ to obtain image patches $B^i$ and mapping image patches $B_{rtv}^i$ so that an image patch set $P_B = \{B^1, B^2, \ldots, B^i\}$ and a mapping image patch set $P_{rtv} = \{B_{rtv}^1, B_{rtv}^2, \ldots, B_{rtv}^i\}$ are respectively obtained after these image patches are cropped; and
   a region selection module configured to count a number of boundary pixels in each mapping image patch $B_{rtv}^i$, and selecting out a mapping image patch $B_{rtv}^{i*}$ with a largest number of boundary pixels in the mapping image patch set $P_{rtv} = \{B_{rtv}^1, B_{rtv}^2, \ldots, B_{rtv}^i\}$, an image patch $B^{i*}$ corresponding to the mapping image patch $B_{rtv}^{i*}$ being an image region that facilitates blur kernel estimation,
wherein the relative total variation value RTV(p) is:

$$RTV(p) = |RTV_x(p)| + |RTV_y(p)| \text{ or}$$

$$RTV(p) = \sqrt{|RTV_K(p)|^2 + |RTV_y(p)|^2},$$

wherein RTV$_x$(p) represents a relative total variation value of the pixel p in a horizontal direction, and RTV$_y$(p) represents a relative total variation value of the pixel p in a vertical direction.

6. The system for selecting an image region that facilitates blur kernel estimation according to claim 5, wherein the relative total variation value of the pixel p in the horizontal direction is:

$$RTV_x(p) = \frac{\sum_{q \in R(p)} g_{p,q} \cdot |(\partial_x B)_q|}{\left|\sum_{q \in R(p)} g_{p,q} \cdot (\partial_x B)_q\right| + \varepsilon},$$

wherein R(p) represents a neighborhood centered on the pixel p, q represents a pixel in the neighborhood, $(\partial_x B)_q$ represents a partial derivative of the pixel q in the horizontal direction, ε represents an infinitesimal quantity which ensures that the denominator of the above equation is not zero, and $g_{p,q}$ represents a weight function, the value of which is inversely proportional to a distance between the pixel q and the pixel p; and the relative total variation value of the pixel p in the vertical direction is:

$$RTV_y(p) = \frac{\sum_{q \in R(p)} g_{p,q} \cdot |(\partial_y B)_q|}{\left|\sum_{q \in R(p)} g_{p,q} \cdot (\partial_y B)_q\right| + \varepsilon},$$

wherein $(\partial_y B)_q$ represents a partial derivative of the pixel q in the vertical direction.

7. The system for selecting an image region that facilitates blur kernel estimation according to claim 6, wherein the sampling module is specifically implemented as follows:

performing pixel overlapping sampling on the blurred image B and its relative total variation mapping image B$_{rtv}$, and in a window sliding manner, cropping an image patch B$^i$ and a mapping image patch B$_{rtv}^i$ with a size of m×m every s pixels, thereby obtaining the image patch set P$_B$={B$^1$, B$^2$, ..., B$^i$} and the mapping image patch set P$_{rtv}$={B$_{rtv}^1$, B$_{rtv}^2$, ..., B$_{rtv}^i$} after cropping the image patches from left to right and from top to bottom.

8. The system for selecting an image region that facilitates blur kernel estimation according to claim 5, wherein the sampling module is specifically implemented as follows:

performing pixel overlapping sampling on the blurred image B and its relative total variation mapping image B$_{rtv}$, and in a window sliding manner, cropping an image patch B$^i$ and a mapping image patch B$_{rtv}^i$ with a size of m×m every s pixels, thereby obtaining the image patch set P$_B$={B$^1$, B$^2$, ..., B$^i$} and the mapping image patch set P$_{rtv}$={B$_{rtv}^1$, B$_{rtv}^2$, ..., B$_{rtv}^i$} after cropping the image patches from left to right and from top to bottom.

* * * * *